United States Patent [19]

Plouvier

[11] Patent Number: 4,913,412

[45] Date of Patent: Apr. 3, 1990

[54] RACK

[76] Inventor: Henri Plouvier, 5, rue Moliere, F-59150 Wattrelos, France

[21] Appl. No.: 286,924

[22] PCT Filed: Feb. 26, 1988

[86] PCT No.: PCT/FR88/00108

§ 371 Date: Nov. 8, 1988

§ 102(e) Date: Nov. 8, 1988

[87] PCT Pub. No.: WO88/06957

PCT Pub. Date: Sep. 22, 1988

[30] Foreign Application Priority Data

Mar. 9, 1987 [FR] France ................................ 87 03155

[51] Int. Cl.[4] ................................................ B23Q 3/00

[52] U.S. Cl. .................................... 269/159; 269/238; 269/287; 269/296; 269/268

[58] Field of Search .................... 269/296, 287, 289 R, 269/268, 158, 159, 902, 295, 238; 182/181-185, 153, 159

[56] References Cited

U.S. PATENT DOCUMENTS

| | | | |
|---|---|---|---|
| 167,667 | 9/1875 | Hollingsworth | 269/296 |
| 173,726 | 2/1876 | Huntington | 269/158 |
| 1,135,815 | 4/1915 | King | 269/159 |
| 1,877,768 | 9/1932 | Koester | 269/238 |
| 2,428,185 | 9/1947 | Wallace . | |
| 2,491,972 | 12/1949 | Halate | 269/158 |
| 4,072,303 | 2/1978 | Szabo | 269/238 |
| 4,457,504 | 7/1984 | Mottla . | |
| 4,566,559 | 1/1986 | Van Asten | 269/296 |
| 4,678,170 | 7/1987 | Sampson | 269/296 |
| 4,718,652 | 1/1988 | Liebenstein | 269/296 |

FOREIGN PATENT DOCUMENTS

| | | |
|---|---|---|
| 929271 | 11/1954 | Fed. Rep. of Germany . |
| 8118370 | 10/1981 | Fed. Rep. of Germany . |
| 155841 | 7/1932 | Switzerland . |

*Primary Examiner*—Robert C. Watson
*Attorney, Agent, or Firm*—Sughrue, Mion, Zinn, Macpeak & Seas

[57] ABSTRACT

A rack, in particular for making up faggots, cutting logs, etc., characterized by the fact that it comprises: a stand (1) defining a supporting polygon (5) suitable for taking position on the ground; a riser (7) fixed to said stand and occupying a plane substantially perpendicular thereto, said riser being situated substantially on one side of said stand; a first jaw (10), said first jaw being substantially in the form of a concave cylinder, with its concave side facing out from a vertical volume (50) extending over said stand and passing through said riser; means (9, 28) for mounting said first jaw on said riser; a second jaw (20), said second jaw being substantially in the form of a concave cylinder; means for mounting said second jaw to rotate about an axis (24) relative to said first jaw (10) such that said axis of rotation lies substantially in the intersection between the two cylindrical surfaces of each of said jaws, and that the two jaws occupy positions relative to each other such that their concave faces face eath other; and a lever (40, 42) fixed to said second jaw, in such a manner as to be contained within said vertical volume (50). The invention is particularly applicable to cutting up logs and to making up faggots.

6 Claims, 3 Drawing Sheets

RACK

The present invention relates to racks, i.e. devices for positioning and holding oblong bodies such as logs of wood, sticks, etc., e.g. for the purpose of subjecting them to transformations which, in the case of logs may be cutting, and in the case of sticks may be bundling to make up faggots.

Racks are already known for positioning and holding logs for the purpose of cutting them. Such "sawhorses" are essentially constituted by substantially plane rectangular supports which are associated to form an X-shaped part with one end of each of its pairs of arms constituting a stand for positioning the rack on the ground, and with the opposite end constituting a fork for holding oblong bodies. In some cases, the two arms of the X-shape may pivot relative to each other in order to allow the rack to be folded away when not in use, thus reducing its size for storage purposes.

Such racks fulfill the function for which they were designed. However, they suffer from various drawbacks which may give rise to accidents. With such a rack, it is relatively difficult to cut up a log while holding the log properly in the V-shaped fork and simultaneously ensuring that the rack is kept stable. Further, racks are not well designed for making up faggots, in particular when a bundle of sticks is to be made up and bound together.

The object of the present invention is to mitigate these drawbacks by providing a rack suitable for positioning and holding the oblong bodies which it is intended to receive, which is very stable without requiring fixing to the ground, and which also makes it very easy to make up bundles such as faggots of sticks.

More precisely, the present invention provides a rack, in particular for making up faggots, cutting logs, etc., characterized by the fact that it comprises:

a stand defining a supporting polygon suitable for taking position on the ground;

a riser fixed to said stand and occupying a plane substantially perpendicular thereto, said riser being situated substantially on one side of said stand;

a first jaw, said first jaw being substantially in the form of a concave cylinder, with its concave side facing out from a vertical volume extending over said stand and passing through said riser;

means for mounting said first jaw on said riser;

a second jaw, said second jaw being substantially in the form of a concave cylinder;

means for mounting said second jaw to rotate about an axis relative to said first jaw such that said axis of rotation lies substantially in the intersection between the two cylindrical surfaces of each of said jaws, and that the two jaws occupy positions relative to each other such that their concave faces face each other; and a lever fixed to said second jaw, in such a manner as to be contained within said vertical volume.

Other characteristics and advantages of the present invention appear from the following description of a nonlimiting example given with reference to the accompanying drawings, in which.

Figure 1:
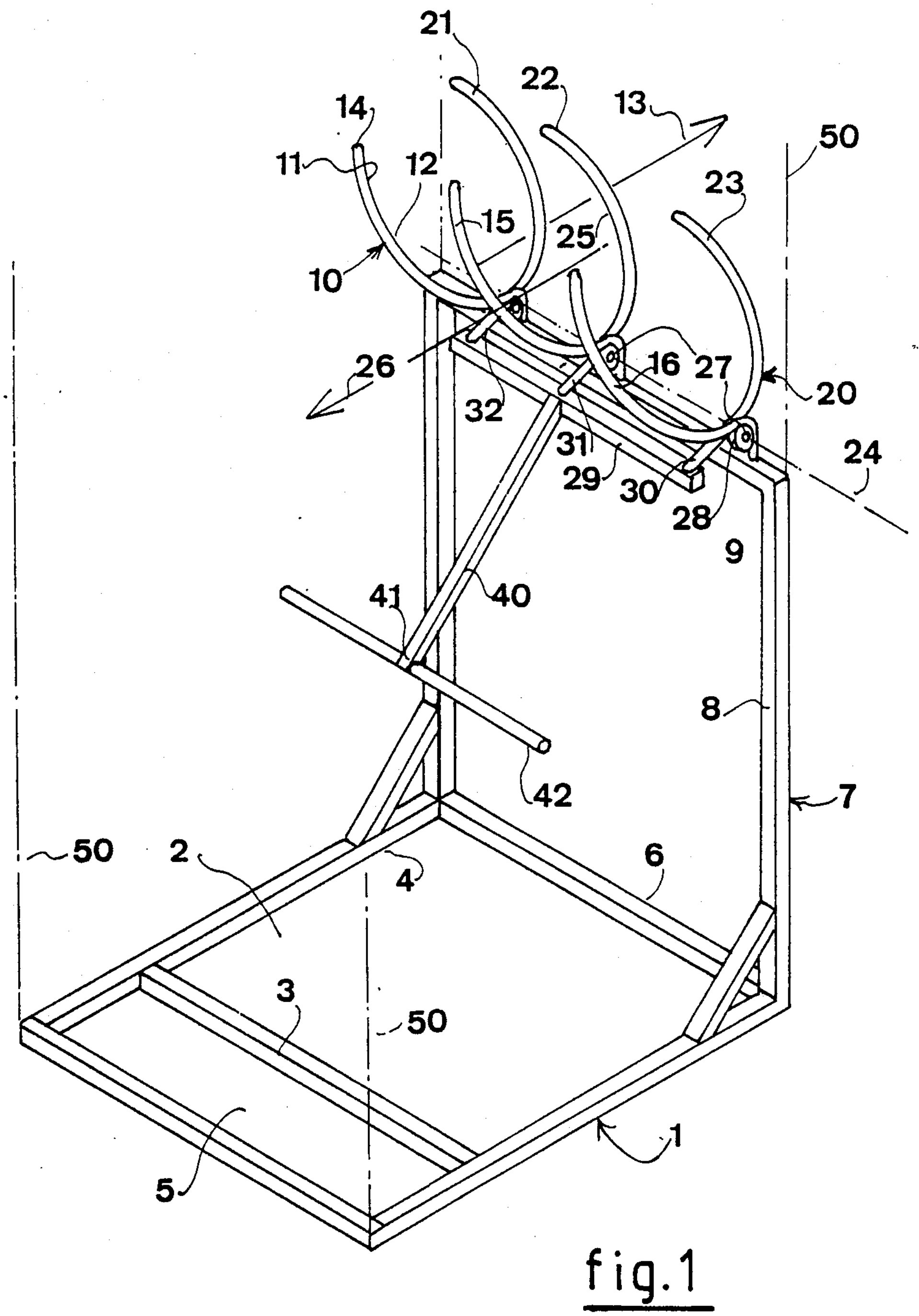
FIG. 1 is a perspective view of an advantageous embodiment of a rack in accordance with the invention.

The rack shown in FIG. 1 comprises a stand 1 constituted by a base 2 made up of tubes 3, 4, . . . which are assembled to one another so as to form a supporting polygon 5 of given area which, in the embodiment shown, is a rectangular area. A riser 7 is fixed on one side 6 of the base 2 and is constituted by a tubular frame 8. This frame is substantially one meter high, but this value is given merely by way of example since it may vary for each utilization or application for which such a rack may be intended.

A first jaw 10 is fixed to the top bar 9 of the riser 7, said jaw advantageously following the shape of a substantially cylindrical surface 11 whose concave side 12 faces out 13 from the vertical volume 50 above the base 2 and including the riser 7.

In this embodiment, the first jaw 10 comprises a plurality of regularly spaced-apart teeth 14, 15, and 16 which define the above-defined cylindrical grasping surface 11. As explained below, such a jaw constituted by a plurality of regularly spaced-apart teeth provides improved grasping of oblong objects whose shapes are not always uniform and which may include irregularities, such as logs of wood or bundles of sticks, for example.

As shown in the figure, the first jaw 10 is fixed so as to be stationary relative to the top bar 9 of the riser 7. However, in some applications, this jaw 10 may be designed to be associated with the riser by adjustable fixing means so as to be capable of having its teeth take up different orientations.

A second jaw 20 is associated with the first jaw 10 and is itself advantageously constituted by another plurality of teeth 21, 22, and 23, which are identical in shape to the above-described teeth 14, 15, and 16. However, this second jaw 20 is mounted to pivot about an axis 24 so as to be capable of pivoting relative to the first jaw 10 and thus also relative to the riser 7. This axis of rotation 24 is thus substantially contained in both of the two cylindrical surfaces defined by the two jaws 10 and 20 whose concave faces face in opposite directions, such that the concave face 25 of the second jaw 20 faces into the volume defined by the base 2 and the riser 7.

To do this, the various teeth 21, 22, and 23 of the second jaw 20 are fixed to a shaft or to a plurality of shafts 27 which are mounted on bearings 28 fixed to the top bar of the riser 7.

The various teeth 21–23 of this second jaw are fixed relative to each other, e.g. by a longitudinal cross bar 29 which is fixed to extensions 30, 31, and 32 on said teeth such that when a force is applied to said cross bar 28 causing it to rotate about the axis, this rotation is transmitted uniformly to all of the teeth 21–23 of the second jaw 20, thereby enabling these teeth to be moved towards the teeth 14–16 or away therefrom, as explained below.

In order to facilitate manipulation and displacement of said second jaw 20 relative to the riser 7, and thus relative to the first jaw 10 which is fixed to the riser, a lever 40 is fixed to the cross bar 29 and is disposed in such a manner as to extend into the above-defined volume 50. When the end 41 of the lever 40 is projected onto the base 2 perpendicularly to the plane of the base 2, said end is contained within the base. Further, the length of the lever 40 is sufficient to ensure that the end piece 42 in the form of a cross bar fitted to its end 41 is at a relatively short distance from the base 40. Thus, as explained below, a person using such a rack can easily place a foot on said end piece 42 which is shaped so as to constitute a foot-rest.

The rack as described above operates and is used as follows, with the following explanation being made more particularly with reference to FIG. 2. It should be observed that since FIG. 2 shows the same embodiment of a rack in accordance with the invention as is shown in FIG. 1, the same reference numerals therein designate the same items.

Figure 2:
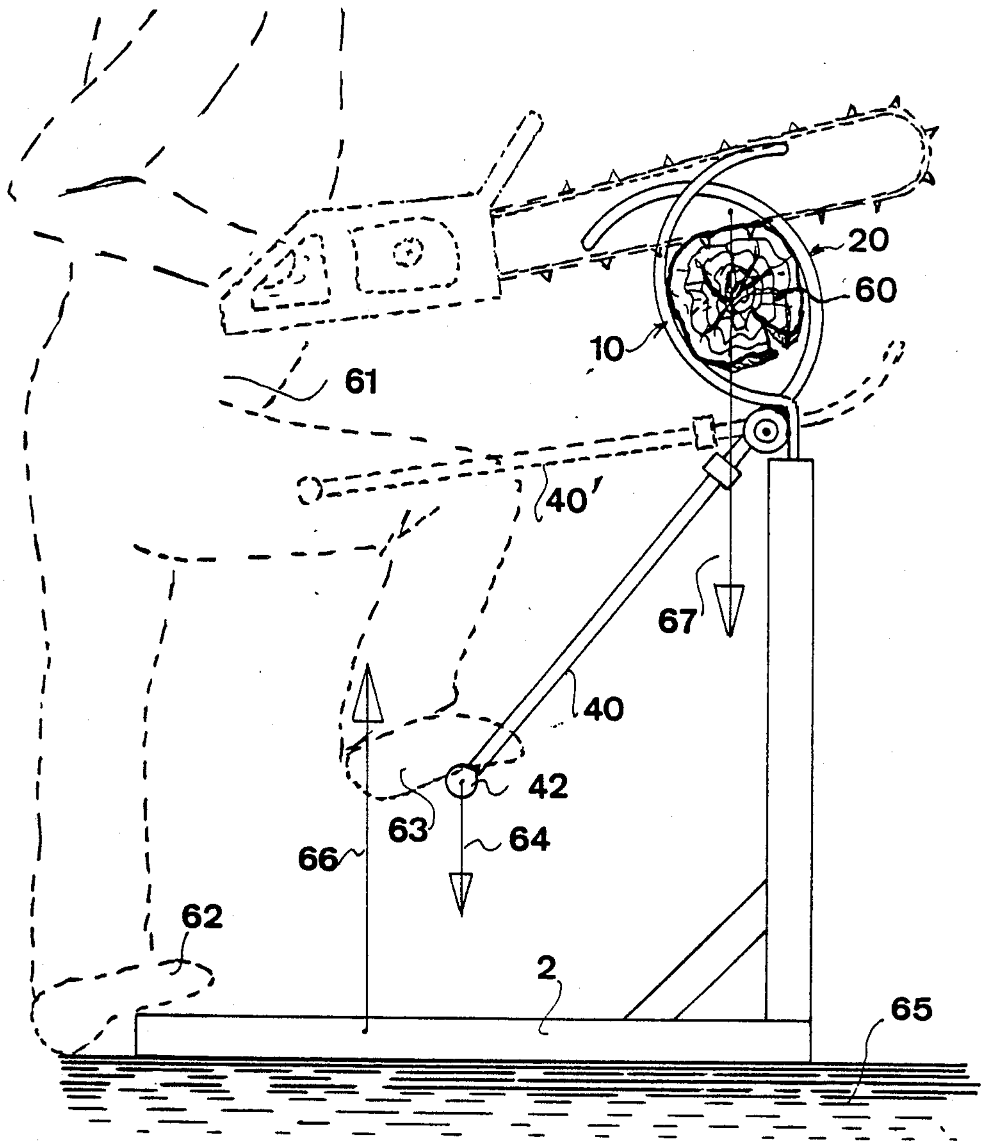
FIG. 2 is a side view of the FIG. 1 rack, showing how such a rack can be used as a sawhouse, and also showing the advantages it provides over prior art sawhouses.

FIG. 2 shows the rack being used for cutting up a log 60. This log is positioned between the two jaws 10 and 20 while they are far enough part to enable it to be inserted therebetween, i.e. when the lever 40 is in a "high" position as represented by dashed lines 40'. The log 60 thus rests against the teeth 14–16 and 21–23 of the two jaws, with the user 61 of the rack placing one foot 62 on the base 2 and the other foot 63 on the end piece 42 of the lever 40 so as to lower the lever 40 towards the base 2 and thus continuously exert a downwardly directed force 64 thereon.

With the rack thus being securely held by the foot 62 of the user 61 and with the two jaws exerting a force to hold the log 60 in place by virtue of the teeth 14–16 and 21–23 which are capable of interleaving between one another, as shown in FIG. 2, said log is prevented from moving in any way even when the user exerts a cutting force 67 thereon at a point lying outside the volume 50, since the user continues to exert a force tending to clamp the jaws together by means of his other foot 63. The user can thus cut the log 60 while holding the cutting instrument in both hands, whereas a prior art sawhouse requires the user to hold the log with one hand and manipulate the cutting instrument with the other.

Naturally, when the user has cut through the log once and if it is necessary to cut through the same log again, the force 64 exerted by his foot 63 is relaxed, thereby allowing the jaws to move apart and release the log 60. The user can then readily displace the log since it continues to be guided inside the receptacle constituted by the two jaws.

The above explanations concerning the use of the rack relate to using it for sawing a log. However, such a rack may also be used for making faggots. In this case, the lever is initially placed in its "high" position 40' moving the two jaws as far apart as possible. Sticks are then collected and piled up in the wide open receptacle, after which the lever is lowered by applying the above-described force 64. As a result the sticks are pressed together and it is advantageously possible to bind them together at various different points along their length. While continuing to retain the base by means of its foot 62 and the bundle of branches by means of the lever 40 which transmits the force 64 exerted by his other foot 63 to the jaw 20, the user remains free to use both hands for cutting up a faggot formed in this way from a dense and uniform bundle of sticks, with the sticks remaining bound together.

The above description of how such a rack can be used shows up its advantages. It is highly stable, and both of the user's hands are free for cutting purposes, thereby considerably reducing the danger of accidents which are always serious with such operations. The user can cut up logs of all sizes and shapes with the same ease and safety, and can also make up faggots which are as densely packed as possible.

The embodiment of the rack described above and shown in FIGS. 1 and 2 has undoubted advantages. However, in use, it is preferable to keep the foot 63 permanently in place on the bar 42 in order to continuously exert the force 64 which serves to clamp various different materials securely between the two jaws 10 and 20. However, it may be useful to have a greater degree of freedom when performing the various operations required for cutting up logs and for bundling up faggots, in particular when binding the sticks together.

Figure 3:
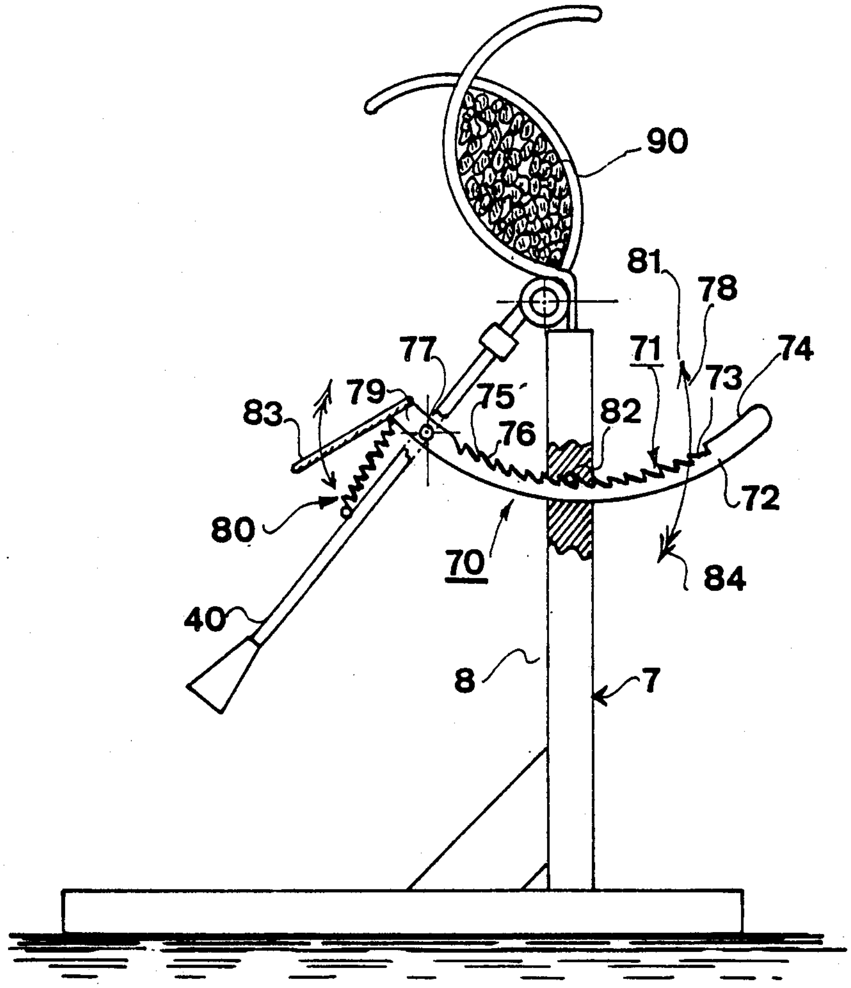
FIG. 3 is a partially cut-away side view of a different advantageous embodiment of a rack in accordance with the invention.

The embodiment shown in FIG. 3 makes it possible to avoid keeping the foot 63 against the bottom of the lever 60. To do this, the rack further includes lockable and unlockable ratchet means 60 capable of providing co-operation between the lever 40 and the riser 7.

In an advantageous embodiment, these lockable and unlockable ratchet means are constituted by an arcuate ratchet 71 mounted between the lever 40 and at least one portion fixed to the riser 7, i.e. to the bars 8 and 9 constituting said riser 7. In the example shown in FIG. 3, the ratchet comprises an arcuate portion 72 including teeth 73 on at least one of its sides 74, with the teeth being substantially in the form of sawteeth delimited by two flanks, one of which, 75, is steeply sloping and the other of which, 76, is gently sloping.

This arcuate portion 72 is pivotally mounted about an axis 77 fixed to the lever 40 so as to be able to rotate to some extent about said axis as illustrated by arrow 78.

In addition, between one end 79 of said arcurate portion and the lever 40, means 80, e.g. a spring, are mounted for applying a resilient force which, in the example shown, is a force tending to exert traction on the end 79 of said arcurate portion in order to pivot it anticlockwise 81, as shown in the figure.

An abutment peg 82 is fixed in position relative to the riser and co-operates with the riser 7, said ped is complementary in shape to the shape of a notch 73 delimited between two teeth, i.e. between the relatively gently sloping flank of one tooth and the relatively steeply sloping flank of the next tooth. The spring 80 acts on the therefor arcuate portion so that the flanks 75 and 76 of the teeth come into abutment against said peg, thereby preventing the arcuate portion from moving to allow the lever 40 to pivot clockwise.

Thus, by exerting a force on the lever 40 to cause it to pivot anticlockwise, the teeth of the arcuate portion are capable of sliding over the peg 82 by virtue of the relatively gentle slope of the flank 76 of each tooth, with the peg taking up its position behind the steeply sloping flank of the next tooth. However, if a force is exerted on the lever tending to rotate it clockwise, the steep flank of a tooth comes into abutment against the peg, thereby preventing the arcurate portion from rotating.

Further, and advantageously, the end 79 of said arcurate portion situated in the proximity of the lever 40 includes manipulation means, e.g. a handle 83, enabling said arcuate portion to be rotated clockwise, when necessary, in particular for releasing the abutment peg 82.

The rack shown in FIG. 3 is used as follows. When the two jaws 10 and 20 are fully opened, they constitute a receptacle into which sticks 90 are placed, e.g. as shown, in order to build up a faggot. When the receptacle is sufficiently filled up, the lever 40 is actuated to rotate it anticlockwise, thereby bringing the two jaws 10 and 20 towards each other. During this movement, the arcurate portion 72 slides over the peg 82 with the teeth jumping thereover, one after another. When the sticks are sufficiently compressed to form a compact faggot, the position of the peg against the arcurate rachet serves to keep the two jaws 10 and 20 clamped together without there being any need for the user to keep his foot on a lever 40. The sticks can then be bound together by passing binding between the teeth of the jaws, and the faggots can then be cut up, if necessary.

In order to disengage the jaws, it is necessary to act on the handle 83 so as to rotate the arcurate ratchet slightly clockwise (84) against the force exerted by the spring, thereby disengaging the tooth from the peg 82 which was locking it in place. The two jaws 10 and 20 can then be moved apart from each other by rotating the lever 40 clockwise so as to fully open the receptacle. The faggot or faggots can then be removed.

With an embodiment of a rack in accordance with the invention as shown in FIG. 3, there is thus no need to continuously exert pressure on the end 42 of the lever 40, given that the lever is held in place by the ratchet.

The base 2 may naturally be slightly larger compared with the embodiment shown in FIGS. 1 and 2 in order to improve the stability of the rack device.

I claim:

1. A rack, in particular for making up faggots, cutting logs, etc., comprising:

a stand (1) defining a supporting polygon (5) suitable for taking position on the ground;

a riser (7) fixed to said stand and occupying a plane substantially perpendicular thereto, said riser being situated substantially on one side of said stand:

a first jaw (10), said first jaw being substantially in the form of a concave cylinder, with its concave side facing away from a vertical volume (50) extending over said stand and passing through said riser;

means (9, 28) for fixedly mounting said first jaw on said riser;

a second jaw (20), said second jaw being substantially in the form of a concave cylinder;

means for mounting said second jaw facing said first jaw and said volume, and for rotation about an axis (24) relative to said first jaw (10) with said axis of rotation lying substantially in the intersection between the two cylindrical surfaces of said jaws, and the two jaws occupying positions relative to each other such that their concave faces face each other; and a lever (40, 42) fixed to said second jaw and contained within said vertical volume (50), whereby the rack is highly stable, both of the user's hands are free for cutting purposes reducing the danger of accidents, logs of various sizes and shapes may be readily cut up with ease and safety and faggots may be densely packed between said jaws.

2. A rack according to claim 1, wherein at least one of said two jaws (10, 20) is constituted by a plurality of teeth (14–16, 21–23).

3. A rack according to claim, wherein said lever (40) terminates at one end in a horizontal cross bar forming an end piece (42) constituting a foot rest.

4. A rack according to claim 1, further including lockable and unlockable ratchet means (70) engaging said lever (40) and said riser (7).

5. A rack according to claim 4, wherein said lockable and unlockable ratchet means (70) are constituted by a ratchet member (71) mounted on said lever and on said riser.

6. A rack in particular for making up faggots, cutting logs, etc. comprising:

a stand (1) defining a supporting polygon (5) suitable for taking position on the ground;

a riser (7) fixed to said stand and occupying a plane substantially perpendicular thereto, said riser being situated substantially on one side of said stand;

a first jaw (10), said first jaw being substantially in the form of a concave cylinder, with its concave side facing away from a vertical volume (50) extending over said stand and passing through said riser;

means (9, 28) for fixedly mounting said first jaw on said riser;

a second jaw (20), said second jaw being substantially in the form of a concave cylinder;

means for mounting said second jaw facing said first jaw and said volume, and for rotation about an axis (24) relative to said firts jaw (10) with said axis of rotation lying substantially in the intersection between the two cylindrical surfaces of said jaws, and the two jaws occupying positions relative to each other such that their concave faces face each other;

a lever (40, 42) fixed to said second jaw and contained within said vertical volume (50);

lockable and unlockable ratchet means (70), said lockable and unlockable ratchet means (70) comprising an arcuate portion (72) including abutment teeth (73), said arcuate portion being pivotally mounted on said lever about a shaft (77), means (80) for applying a resilient force between said arcuate portion (72) and said lever (40), an abutment peg (82) fixed to said raiser (7) in a position to be engaged by said abutment teeth (73) of said arcuate portion (72), and said resilient means acting on said arcuate portion (72) so as to urge the abutment teeth (73) to engage said abutment (82) and prevent displacement of said arcuate portion in at least one direction.

* * * * *